(12) United States Patent
Wong et al.

(10) Patent No.: US 8,442,579 B2
(45) Date of Patent: May 14, 2013

(54) DISTRIBUTED ADAPTIVE RESOURCE ALLOCATION TO ENHANCE CELL EDGE THROUGHPUT

(75) Inventors: Wendy Wong, San Jose, CA (US);
Qinghua Li, San Ramon, CA (US);
Feng Xue, Newbury Park, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 13/077,715

(22) Filed: Mar. 31, 2011

(65) Prior Publication Data

US 2012/0252470 A1    Oct. 4, 2012

(51) Int. Cl.
*H04M 1/00*        (2006.01)
*H04W 72/00*       (2009.01)

(52) U.S. Cl.
USPC .................................. 455/550.1; 455/452.2

(58) Field of Classification Search ............... 455/452.2, 455/11.1, 63.1, 422.1, 522; 370/347, 244, 370/252, 328, 331
See application file for complete search history.

(56) References Cited

U.S. PATENT DOCUMENTS

2007/0207828 A1*  9/2007  Cheng et al. .................. 455/522
2010/0267333 A1* 10/2010  Lamm et al. ................. 455/11.1
2010/0273502 A1* 10/2010  Uemura et al. ............ 455/452.2

* cited by examiner

*Primary Examiner* — Kiet Doan
(74) *Attorney, Agent, or Firm* — Schwabe, Williamson & Wyatt, P.C.

(57) ABSTRACT

Embodiments of a system and methods for distributed adaptive resource allocation to enhance cell edge throughput are generally described herein. Other embodiments may be described and claimed.

9 Claims, 3 Drawing Sheets

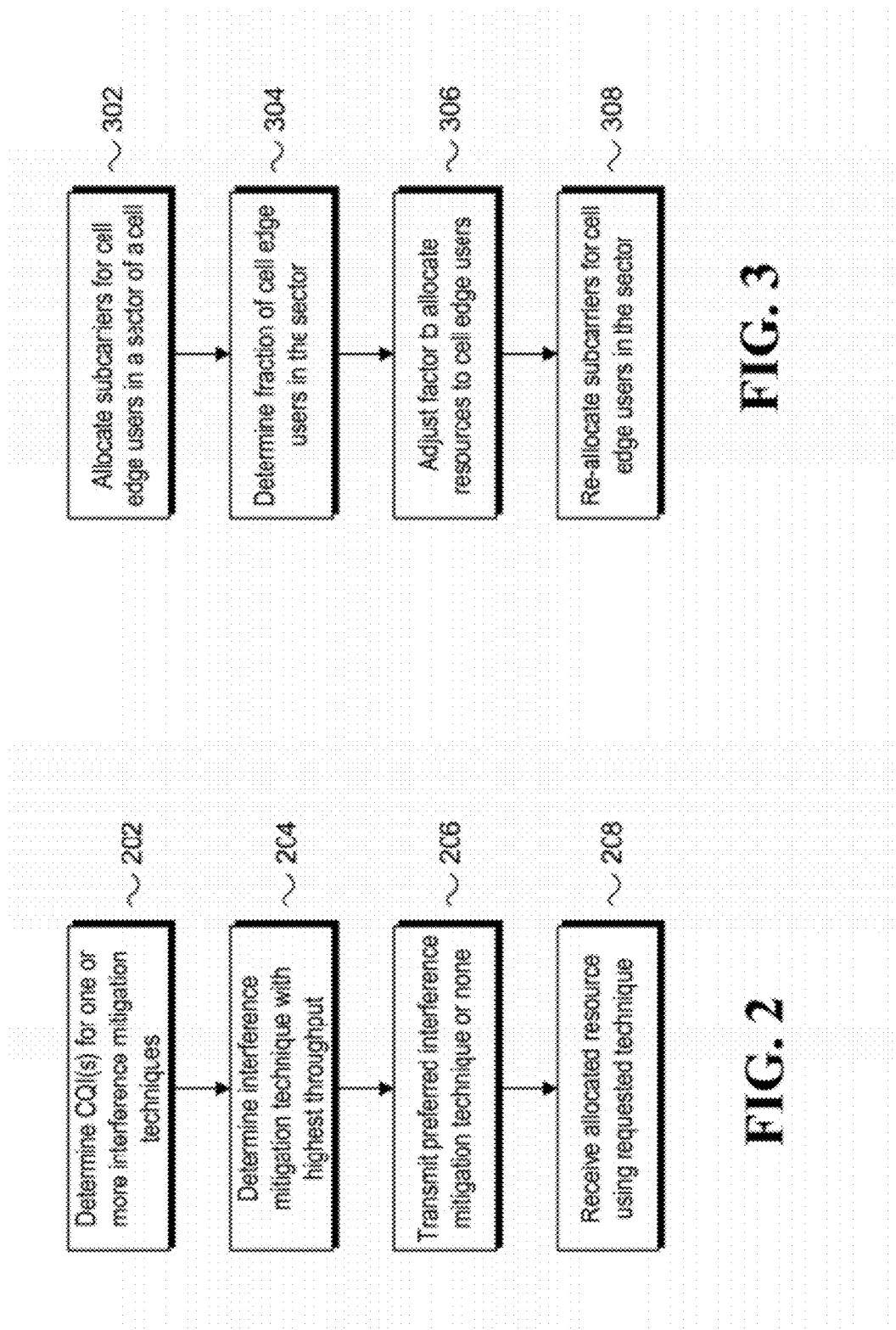

DISTRIBUTED ADAPTIVE RESOURCE ALLOCATION TO ENHANCE CELL EDGE THROUGHPUT

FIELD OF THE INVENTION

This application relates generally to wireless communications and, more particularly, to resource allocation in a wireless network.

BACKGROUND

The performance of wireless cellular systems can be limited for users near multiple sectors or on the periphery of a cell, known as a cell edge. These cell edge users often suffer from low throughput due to one or more factors including interference from other radio sources and/or low received power from an intended transmitter. Proportional fair schedulers can allocate equal resources to all users when averaged over a very long period of time. However in the short run, cell edge users typically have a lower throughput rate. Solutions such as fractional frequency reuse allocates a fraction of total available resources to cell edge users in a semi-static manner and the fraction of available resources are applied on an aggregate basis, or over a large number of sectors of cells, as opposed to a sector-specific application of resources.

BRIEF DESCRIPTION OF THE DRAWINGS

The present invention is illustrated by way of example and not as a limitation in the figures of the accompanying drawings, in which:

FIG. 2 is a diagram illustrating a method for distributed adaptive resource allocation, according to some embodiments;

FIG. 3 is a diagram illustrating a method for distributed adaptive resource allocation, according to some embodiments.

DETAILED DESCRIPTION

Embodiments of methods and systems for providing distributed adaptive resource allocation in a wireless cellular network are described herein. In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of embodiments of the invention.

Figure 1:
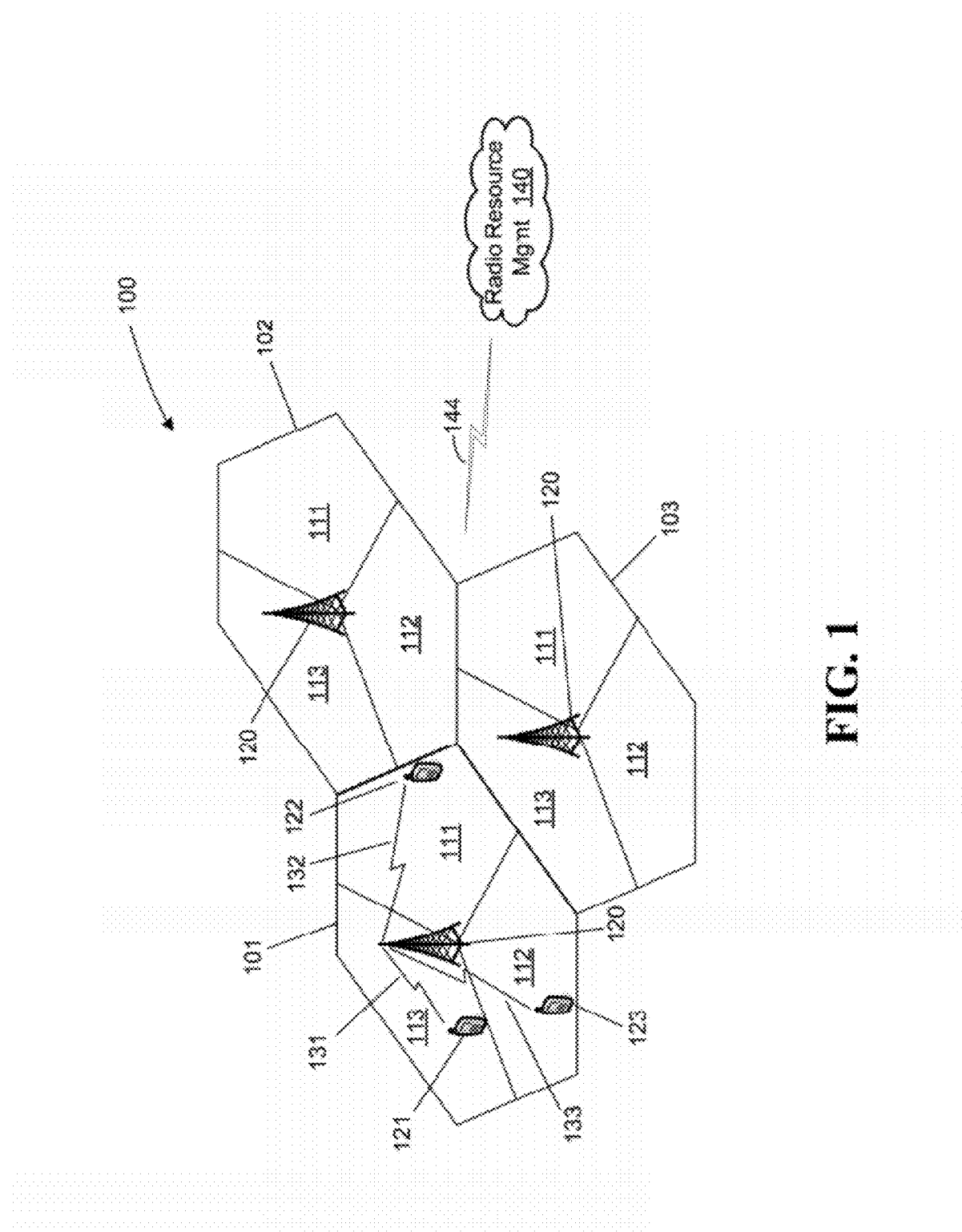
FIG. 1 is a diagram of users in a wireless network.

It would be an advance in the art to increase throughput, capacity, and/or coverage improvements in a wireless network, particularly for users located at or near a boundary or boundaries of a sector of a cell, or cell edges such as a first user 121, second user 122, and third user 123 in a first cell 101 of a wireless network 100 of FIG. 1. The cell edges may be directly adjacent to another sector of the same cell as in the case of the first user 121 (member of third sector 113 and adjacent to second sector 112 of first cell 101), directly adjacent to one or more sectors in another cell such as the second user 122 (member of first sector 111 of the first cell 101 and adjacent to second sector 112 and third sector 113 of second cell 102), or in the case of the third user 123, at a boundary of sector 112 of the first cell 101 but not directly adjoining another sector boundary.

Cell edge users in a cellular deployment of a wireless network 100 often suffer from low throughput due to interference and/or low received power. Prior solutions such as fractional frequency reuse (FFR) deployed in the sectors of cells, as illustrated in FIG. 1 having a plurality of cells comprising the first cell 101, a second cell 102 and third cell 103 are partitioned into multiple sectors including a first sector 111, a second sector 112, and a third sector 113. Resources made available for each cell are divided among the sectors in each cell. For example, the first cell 101 with FFR deployed amongst three sectors (i.e. 111, 112, and 113) results in dividing total available resources so that each sector receives ⅓ of the total resources. The base stations at wireless tower 120 may further implement transmit beamforming and nulling (BFaN) to allocate resources to serving cell edge users in a semi-static manner. However, each serving station, eNode-B, or base station at wireless tower 120 in the embodiment of FIG. 1 does not independently modify allocation of resources for each sector in the cell using traditional BFaN.

Inefficient allocation of resources can occur because a ratio between a number of cell edge users and users more centrally-located in a sector of each cell changes over time and is specific to each sector of each cell. Prior solutions have attempted to address the changes in resource allocation by having each base station at wireless tower 120 send cell edge user information to a centralized radio resource manager (RRM) 140 over an RRM link 144. The RRM 140 receives base station data and monitors changes in a number of cell edge users within a network to provide new resource allocation to all base stations at wireless tower 120 in the wireless network 100. However, determination of cell edge users is performed on an aggregate basis at the RRM 140 instead of at each individual base station at wireless tower 120, and the process of gathering and evaluating all the data can be slow.

Cell edge users may be determined to be signal to interference (SIR) limited (interference limited) and/or signal to noise ratio (SNR) limited (noise limited). As an example, the first user 121 of FIG. 1 is interference limited. The first user 121 is positioned in the third sector 113 and near the edge of the second sector 112, while being positioned close to the wireless tower 120 serving sector 113 and the wireless tower 120 serving sector 112, of the first cell 101. As a result, the first user 121 may have a relatively high SNR due to its close proximity to the serving base station, wireless tower 120 of the first cell 101, but a relatively low SIR due to close proximity to the base station serving sector 112 at wireless tower 120 of the first cell 101. The third user 123 is noise limited in embodiments. It is positioned relatively far away from its serving base station at wireless tower 120 of the first cell 101, resulting in a relatively low SNR which may be due to a low signal power. The second user 122 is both interference and noise limited in embodiments. The second user 122 is positioned relatively far away from the serving base station serving sector 111 of the first cell 101 and far away from the base stations serving second sector 112 and the third sector 113 of the second cell 102 resulting in a relatively low SNR and SIR.

Implementation of traditional solutions to improve the performance of cell edge users can significantly degrade performance of other users in a common cell, leading to a decrease in overall performance of an average user in the cell. For example, implementation of FFR as illustrated in FIG. 1 may help interference limited users with a low SIR, but reduces throughput for the noise limited users due to fractional application of resources applied to any particular sector in the cell.

Alternately, use of a precoding matrix indicator (PMI) restriction does not separate cell center and cell edge user resources. Use of PMI by cell edge users requires the cell edge users to measure and report precoding matrices of neighboring cells to the user's serving station. Serving stations in the wireless network 100 such as the base stations at wireless towers 120 exchange the restricted precoding matrices on a periodic basis over a backhaul connection, which restricts mobility of the users and may prevent high mobility users from using PMI restrictions.

It would be an advance to provide systems and methods so that interference mitigation techniques can be selectively applied to each individual cell edge user, providing customized interference mitigation for each cell edge user. For example, it would be helpful for the interference limited users to enable interference mitigation techniques, while allowing noise limited users to use more allocated edge resources and selectively opt out of the use of interference mitigation techniques that can reduce a throughput rate for the noise limited user. In embodiments, each serving station can independently determine how much channel resource is allocated to serving cell edge users without coordination with other serving stations. In addition, each cell edge user can independently determine which interference mitigation technique is selected or not for its communication with the serving station.

Embodiments for increasing throughput, capacity, and coverage improvements in the cell described herein avoid the issues created by prior solutions through implementation of a distributed and adaptive resource allocation on a per link basis between a mobile station and its serving station, through implementation of a factor to tradeoff cell edge user throughput rate with an average cell throughput rate, and/or by allowing a cell edge user to use cell edge resources without enablement of interference mitigation schemes. Embodiments described herein avoid the problems posed by prior solutions by allowing each serving station to allocate resources according to, for example, a fraction of cell edge users in a sector of a cell.

A factor such as a multiplier may be applied independently by each serving station to tradeoff an increase in cell edge user throughput rate for a decrease in an average throughput rate for all users in a sector of a cell, on a dynamic basis, while eliminating coordination with an outside entity such as the RRM 140 or the one or more neighboring serving stations. Further, each serving station may align subcarriers in resources allocated to serving cell edge users. For serving stations with more cell edge users, they may use all allocated cell edge resources to serving cell edge users. For serving stations with fewer cell edge users, they can allocate part of the allocated cell edge resources to serving all users. Also, a framework is provided to allow cell edge users in a sector of a cell to inform the serving station whether the cell edge user wants to enable interference mitigation schemes or not, and to allow each cell edge user to select the cell edge user's own interference mitigation scheme.

FIG. 2 is a diagram illustrating methods for distributed adaptive resource allocation, according to some embodiments. A user in a sector of a cell may be classified as a cell edge user or center cell user by a serving station, may determine the classification independent of the serving station, or may work in coordination with the serving station to ascertain how the user is classified in the cell. Once the user is classified, the user may identify subcarriers allocated to serving cell edge users in the cell, as allocated by the serving station.

In element 202, a user considers available channel quality indicators (CQI)s that may be measured or otherwise determined and selects one or more of the CQIs to evaluate available interference mitigation techniques, wherein a particular CQI may be determined for each interference mitigation technique for each user. Each user may be a device such as the devices (402, 406) described later in reference to FIG. 4 and may be a platform, user equipment (UE), subscriber station (SS), station (STA), mobile station (MS), advanced mobile station (AMS), high throughput (HT) station (STA), or very HT STA (VHT STA). The various forms of devices such as the platform, UE, SS, MS, HT STA, and VHT STA may be interchanged and reference to a particular device does not preclude other devices from being substituted in various embodiment(s). The serving station may be a device such as the devices (402, 406) described later in reference to FIG. 4 and may be a base station (BS), access point (AP), node, node B, or enhanced node B (eNode-B). Further, these terms may be conceptually interchanged, depending on which wireless protocol is being used in a particular wireless network, so a reference to BS herein may also be seen as a reference to either of ABS, eNode-B, or AP as one example.

Each user may communicate according to one or more cellular-based communications using an appropriate cellular standard including second generation cellular standards (2G) such as Global System for Mobile Communications (GSM), Code Division Multiple Access (CDMA) or IS-95, according to third generation cellular standards (3G) such as wideband CDMA (W-CDMA), CDMA-2000, evolution data only (EV-DO), high speed packet access (HSPA), and according to standards beyond 3G including 4G which may include HSPA+, worldwide interoperability for microwave access (WiMAX) as described in the IEEE 802.16 family of standards, and long term evolution (LTE) and/or future versions and/or derivatives thereof. Further, each user may also communicate according to one or more protocols supported by networks such as a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with millimeter wave (MM-wave) communications including the 60 GHz band ((57-66 GHz), IEEE 802.11 (IEEE Standard for Information technology—Telecommunications and information exchange between systems—Local and metropolitan area networks—Specific requirements, Part 11: Wireless LAN Medium Access Control (MAC) and Physical Layer (PHY) Specifications—June 2007), 802.11a, 802.11b, 802.11g, 802.11n, 802.11 task group ac (TGac), and 802.11 task group ad (TGad).

Each user may use one or more parameters to generate the CQI including a signal to noise plus interference ratio (SINR), signal to interference ratio (SIR), received signal strength (RSSI), bit error rate (BER), and block error rate (BLER) to determine the CQI over one or more wireless channels or number of sub-carriers. The interference mitigation techniques or modes available to the user include open loop or closed loop types of interference mitigation techniques and may include FFR, precoding matrix indicator (PMI) restriction, cross-tone beamforming and nulling or other interference mitigation methods known to those skilled in the art. As an example, in spatial cross-tone beamforming and nulling, the same signal is transmitted over multiple subcarriers and multiple transmit antennas and received with multiple receive antennas. Beamforming weights are applied to subcarriers and the transmit and/or receive antennas to form nulls and beams to reduce interference at undesirable locations and to focus signals to desired users.

In element 204, an interference mitigation technique is evaluated based at least in-part on the one or more CQI(s) evaluated in element 202. In an embodiment, the interference mitigation technique that provides the best performance, such as highest throughput, is selected by the user, however the embodiment is not so limited and other performance parameters may be selected in other embodiments to determine a desired interference mitigation technique. Alternately, the user may determine that selection and use of any available interference mitigation technique may impair performance or gain of the user and therefore decide to forego or not use an interference mitigation technique. The user may also select a modulation and coding scheme (MCS) either in conjunction with, or independent of the selection of the interference mitigation technique. For example, the user may be able to select a more efficient MCS if a higher SINR is provided through selection of an appropriate interference mitigation technique, thereby providing an overall higher throughput rate for the user.

The user may optionally signal its desired interference mitigation technique to a serving station by using unused or otherwise available modes, using bits such as MCS selection bits. In an alternate embodiment, a separate information element (IE) may be derived, such as in the media access control (MAC) layer, to specify the interference mitigation mode selected by the user in element 204.

In element 206, the cell edge user transmits its selection of an interference mitigation technique, or no application of an interference mitigation technique, and the selection is transmitted by the cell edge user to a receiver such as a serving station. In response, the cell edge user receives allocated resources from a serving station using the requested interference mitigation technique in element 208, wherein the requested interference mitigation technique helps improve system performance and/or quality of service for the cell edge user. The allocated resources provided by the serving station may relate to transmission power, scheduling, modulation rate, channel and/or subcarrier assignment(s).

Now turning to FIG. 3, which is a diagram illustrating methods for distributed adaptive resource allocation, according to some embodiments. Embodiments of the methods described in FIG. 3 may be implemented independently or in combination with one or more of the elements of FIG. 2. Further, the elements of FIG. 2 may be implemented independently or in combination with one or more elements of FIG. 3. In element 302, subcarriers used in a sector of a cell are allocated for use by cell edge users in the sector. Users in the sector of a cell, which may be classified as center cell users and cell edge users, are identified and a fraction of cell edge users in the sector is determined in element 304.

Resources are allocated to cell edge users in element 306 wherein if a serving station has a first percentage of cell edge users (Q %), the serving station can allocate on average Q % of channel resources to serving cell edge users only over time. This is achieved by a serving station by allocating a channel resource unit per frame to serving cell edge users with a probability based, at least in part, on a factor such as a multiplier Q %×multiplier). In an embodiment, a value of the multiplier, wherein the multiplier may be equal to or greater than 1 is chosen to increase a throughput gain of cell edge users while keeping an average cell user throughput rate drop, within the sector, to be substantially at or below a threshold level. For example, the multiplier may be selected to maximize cell edge users throughput gain to be substantially equal to or greater than 10% while keeping the average cell user throughput rate drop to be less than or equal to 5% compared to a baseline scheme when the resource allocation method described herein is not employed.

The factor, as described in reference to element 306, is determined by each serving station and is dependent at least in-part on an allowable throughput rate drop for an average user in the sector of a cell served by the serving station. The serving station re-allocates subcarriers for cell edge users in the sector in element 308. Cell edge users within a sector would receive an average of (Q %×multiplier) of total channel resources over time. If the multiplier is greater than 1, then cell edge users would receive greater than an average portion (Q %) of resources allocated to the fraction (Q %) cell edge users in the sector of a cell.

Figure 4:
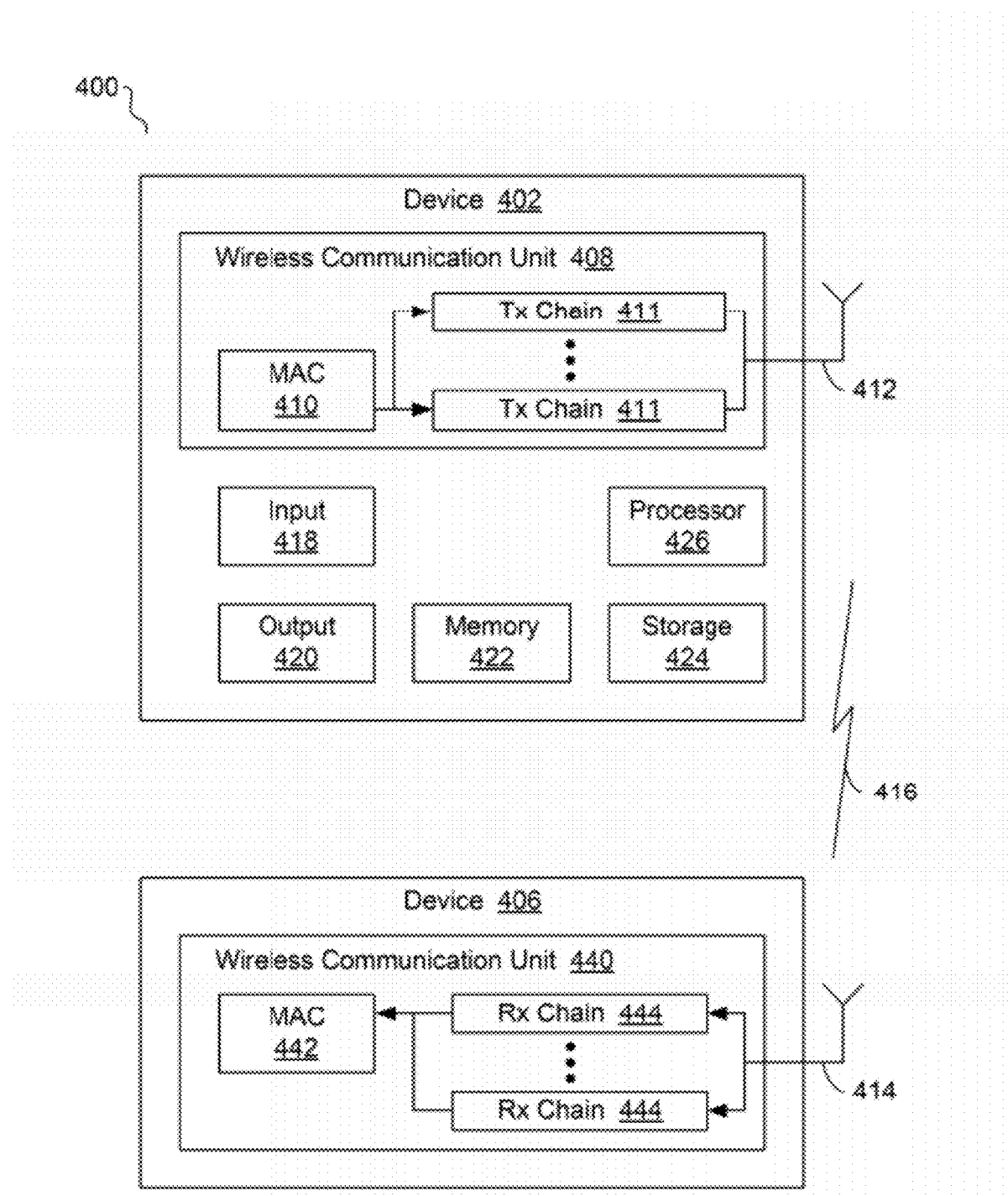
FIG. 4 is a schematic block diagram illustration of a system, in accordance with some demonstrative embodiments.

Reference is now made to FIG. 4, which schematically illustrates a block diagram of a system 400 configured for communication using distributed adaptive resource allocation in accordance with some demonstrative embodiments. The system 400 includes one or more wireless communication devices capable of communicating content, data, information and/or signals over a wireless communication link 416 comprising a number of channels, carriers, and/or subcarriers. One or more elements of system 400 may optionally be capable of communicating over any suitable wired communication links.

In some demonstrative embodiments, device 402 or user includes a wireless communication unit 408 to transmit, via one or more antennae 412, a wireless transmission to device 406 over wireless communication link 416. Device 406 or user includes a wireless communication unit 440 to receive the wireless transmission via one or more antennae 414. Types of antennae that may be used for antennae 412 and/or 414 may include but are not limited to internal antenna, dipole antenna, omni-directional antenna, a monopole antenna, an end fed antenna, a circularly polarized antenna, a micro-strip antenna, a diversity antenna and the like.

In some embodiments, wireless communication devices 402 and/or 406 may also include, for example, one or more of a processor 426, an input unit 418, an output unit 420, a memory unit 422, and a storage unit 424. Wireless communication devices 402 and/or 406 may optionally include other suitable hardware components and/or software components. The wireless communication devices 402 and/or 406 may further comprise transmission and reception capabilities in a single device wherein some or all of the components of each of wireless communication devices 402 and/or 406 may be enclosed in a common housing or packaging, and may be interconnected or operably associated using one or more wired or wireless links. In other embodiments, components of each of wireless communication devices 402 and/or 406 may be distributed among multiple or separate devices.

Processor 426 includes, for example, a Central Processing Unit (CPU), a Digital Signal Processor (DSP), a graphics processing unit, one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 426 executes instructions, for example, of an Operating System (OS) of wireless communication devices 402 and/or 406 and/or of one or more suitable applications.

Memory unit 422 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 424 includes, for example, a hard disk drive, a floppy disk drive, a Compact Disk (CD) drive, a CD-ROM drive, a DVD drive, or other suitable removable or non-removable storage units. Memory unit 422 and/or storage unit 424, for example, may store data processed by wireless communication device 402 and/or 406.

The devices (402, 406) may include wireless electronic devices such as a laptop computer, a smartphone, a handheld computer, a tablet computer, a cellular telephone, a netbook, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices.

In some demonstrative embodiments, wireless communication link 416 includes a number of contiguous wireless communication channels. The phrase "contiguous channels", as used herein, may refer to two or more wireless communication channels that are adjacent, neighboring, and/or bordering one another. In alternate embodiments, a number of channels may be dis-contiguous wherein two or more wireless communication channels in a channel block or channel segment are non-adjacent or are separated by a frequency range.

The wireless communication unit 408 may include a plurality of transmit (Tx) chains 411 to transmit the wireless transmission over the plurality of wireless communication channels. Wireless communication unit 440 may include a plurality of receive (Rx) chains 444 to receive the wireless transmission over the plurality of wireless communication channels. In some demonstrative embodiments, Tx chains 411 and/or Rx chains 444 may include any suitable Physical-layer (PHY) chains and/or components; any suitable Radio-Frequency (RF) chains and/or components; and/or any other suitable elements.

The wireless communication unit 408 may also include a media-access-controller (MAC) 410, e.g., a single MAC, to commonly control the transmissions via Tx chains 411; and/or wireless communication unit 440 may include a MAC 442, e.g., a single MAC, to commonly control the reception via Rx chains 444, e.g., as described in detail below. In some demonstrative embodiments, MAC 410 may control Tx chains 411 to simultaneously transmit symbols of a wireless communication packet over the plurality of wireless communication channels of wireless communication link 416. MAC 442 may control Rx chains 444 to simultaneously receive the symbols of the wireless communication packet over the plurality of wireless communication channels of wireless communication link 416. In embodiments, the device 402 comprises a wireless communications unit 408 configured to determine that the device 402 is a cell edge user and to transmit a first signal to a serving station, such as device 406, to notify the serving station that a status of the device 402 is a cell edge user, and to receive a second signal from the serving station, wherein the second signal allocates resources to the device 402, wherein the resources are allocated to the device 402 based on the cell edge user status.

As described in reference to FIGS. 1 through 4, the device (i.e. 402, 406) may be configured to allocate resources in a wireless network 100 by determining an initial transmission throughput over a channel in the wireless communications network, wherein the initial transmission is sent by a device. The device may determine interference mitigation techniques available to the device and calculate a channel quality indicator (CQI) for each interference mitigation technique available to the device. The device may determine a preferred interference mitigation technique that provides a highest transmission throughput, based at least in-part on the CQI. The device may transmit a signal to indicate the preferred interference mitigation technique if the highest transmission throughput is greater than the initial transmission throughput. The device may further be configured to determine an initial transmission throughput over the channel and to determine a preferred interference mitigation technique to provide a highest transmission throughput for the device. The device may be configured to determine interference mitigation techniques available to the device and to calculate a channel quality indicator (CQI) for each interference mitigation technique available to the device. Further, a wireless communication unit 408 in the device may be configured to generate a signal to indicate a preferred interference mitigation technique if the highest transmission throughput is greater than the initial transmission throughput. Further, the wireless communication unit 408 may be configured to generate a signal to indicate that no interference mitigation technique will be applied by the device if the highest transmission throughput is less than the initial transmission throughput.

Further, as described in reference to FIGS. 1 through 4, the device (i.e. 402, 406) such as a base station or eNode-B may be configured to determine the fraction (Q %) of cell edge users within a sector and allocate (Q %×multiplier) resources in a wireless network 100 to serving cell edge users in a sector of the wireless network 100. The device may determine an interference mitigation technique selection from a cell edge user by receiving a signal from the cell edge user, wherein the interference mitigation technique is based at least in-part on a channel quality indicator (CQI) determined by the cell edge user. The interference mitigation technique selection provided may be that no interference mitigation technique is requested by the cell edge user. The device may transmit a subsequent signal to change the multiplier allocated to cell edge users in the sector according to the changing fraction of cell edge users within the sector and to maintain quality of service to cell edge users.

The methods and devices described herein benefits cell edge users and allows each serving station in a wireless network to decide how to allocate resources to cell edge users without having to coordinate with neighboring serving stations. Cell edge users that are interference limited can benefit from interference mitigation schemes. Cell edge users that are noise limited can benefit by having more dedicated resources allocated to the cell edge users while at the same time disabling interference mitigation techniques which may decrease a throughput rate for the cell edge user. Further, the serving station may apply a factor such as a multiplier to dynamically apply more or less resources to cell edge users. This allows the serving station to allocate more resources when they need the resources to satisfy their particular quality of service (QoS) and then re-allocate resources back to all users in the cell when service flow ends.

While specific embodiments of, and examples for, the invention are described herein for illustrative purposes, various equivalent modifications are possible within the scope of the invention, as those skilled in the relevant art will recognize. In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Thus, embodiments of this invention may be used as or to support a software program executed upon some form of processing core (such as a processor of a computer) or otherwise implemented or realized upon or within a machine-readable medium. A machine-readable medium includes any mechanism for storing information in a tangible form readable by a machine (e.g., a computer). For example, a machine-readable medium can include such as a read only memory (ROM); a random access memory (RAM); a magnetic disk storage media; an optical storage media; and a flash memory device, etc.

Modifications may be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A device, comprising a wireless communications unit configured to:
   determine that the device is a cell-edge user; determine interference mitigation techniques available to the device; calculate a channel quality indicator (CQI) for each interference mitigation technique available to the device;
   determine a preferred interference mitigation technique from the interference mitigation techniques available to the device, wherein the preferred interference mitigation technique is the interference mitigation technique that provides a relatively highest transmission throughput for the device with respect to the available interference migitation techniques;
   transmit a first signal to a serving station to notify the serving station of a cell-edge-user status of the device;
   receive a second signal from the serving station allocating resources to the device, wherein the resources are allocated to the device based on the cell-edge-user status of the device; and
   transmit a third signal to indicate a preferred interference mitigation technique if the relatively highest transmission throughput is greater than a previous transmission throughput.

2. The device of claim 1, wherein the wireless communication unit is configured to transmit a third signal to indicate that no interference mitigation technique will be applied by the device if the relatively highest transmission throughput is provided without enabling any interference mitigation technique.

3. The device of claim 1, wherein the device is selected from the group consisting of a platform, user equipment (UE), subscriber station (SS), station (STA), mobile station (MS), advanced mobile station (AMS), high throughput (HT) station (STA), and a very HT STA (VHT STA).

4. A method comprising:
   determining, at a mobile device, that the mobile device is a cell-edge user;
   determining interference mitigation techniques available to the mobile device;
   calculating a channel quality indicator (CQI) for each interference mitigation technique available to the mobile device;
   determining a preferred interference mitigation technique from the interference mitigation techniques available to the mobile device, wherein the preferred interference mitigation technique is the interference mitigation technique that provides a relatively highest transmission throughput for the device with respect to the available interference mitigation techniques;
   transmitting a first signal to a serving station to notify the serving station of a cell-edge-user status of the mobile device;
   receiving a second signal from the serving station allocating resources to the mobile device, wherein the resources are allocated to the mobile device based on the cell-edge-user status of the mobile device; and
   transmitting a third signal to indicate a preferred interference mitigation technique if the relatively highest transmission throughput is greater than a previous transmission throughput.

5. The method of claim 4, further comprising transmitting a third signal to indicate that no interference mitigation technique will be applied by the mobile device if the relatively highest transmission throughput is provided without enabling any interference mitigation technique.

6. The method of claim 4, wherein the mobile device is selected from the group consisting of a platform, user equipment (UE), subscriber station (SS), station (STA), mobile station (MS), advanced mobile station (AMS), high throughput (HT) station (STA), and a very HT STA (VHT STA).

7. A mobile device comprising:
   a processor configured to:
      determine that the mobile device is a cell-edge user;
      determine interference mitigation techniques available to the mobile device;
      calculate a channel quality indicator (CQI) for each interference mitigation technique available to the mobile device; and
      determine a preferred interference mitigation technique from the interference mitigation techniques available to the mobile device, wherein the preferred interference mitigation technique is the interference mitigation technique that provides a relatively highest transmission throughput for the device with respect to the available interference mitigation techniques;
   a transmitter configured to:
      transmit a first signal to a serving station to notify the serving station of a cell-edge-status of the mobile device; and
      transmit a third signal to indicate a preferred interference mitigation technique if the relatively highest transmission throughput is greater than a previous transmission throughput; and
   a receiver configured to receive a second signal from the serving station allocating resources to the mobile device, wherein the resources are allocated to the mobile device based on the cell-edge-user status of the mobile device.

8. The mobile device of claim 7, wherein the transmitter is further configured to transmit a third signal to indicate that no interference mitigation technique will be applied by the mobile device if the relatively highest transmission throughput is provided without enabling any interference mitigation technique.

9. The mobile device of claim 7, wherein the mobile device is selected from the group consisting of a platform, user equipment (UE), subscriber station (SS), station (STA), mobile station (MS), advanced mobile station (AMS), high throughput (HT) station (STA), and a very HT STA (VHT STA).

* * * * *